United States Patent [19]

Slusarczyk

[11] Patent Number: 6,064,919

[45] Date of Patent: *May 16, 2000

[54] PAINT EQUIPMENT SET-UP METHOD AND APPARATUS

[75] Inventor: Kevin Slusarczyk, Taylor, Mich.

[73] Assignee: BASF Corporation, Southfield, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/822,669

[22] Filed: Mar. 24, 1997

[51] Int. Cl.[7] .............................. G06F 19/00; G05B 13/02
[52] U.S. Cl. ............................ 700/117; 700/123; 700/29; 700/30; 700/33
[58] Field of Search ................................ 901/43; 239/69; 241/30; 700/115, 116, 117, 67, 123, 29, 30, 33; 118/688, 696, 697

[56] References Cited

U.S. PATENT DOCUMENTS

| | | | |
|---|---|---|---|
| 5,386,945 | 2/1995 | Nose et al. ................................. | 241/30 |
| 5,689,415 | 11/1997 | Calotychos et al. .................... | 364/172 |

OTHER PUBLICATIONS

George E. P. Box, William G. Hunter, J. Stuart Hunter, *Statistics for Experimenters*, Copyright © 1978 by John Wiley & Sons, Inc., pp. 291–373.

*Primary Examiner*—Paul P. Gordon
*Attorney, Agent, or Firm*—John V. Biernacki

[57] ABSTRACT

The painting equipment controller controls automotive painting equipment so that desired painting attributes can be achieved. A database is used for storing mathematical models which interrelate painting factors with painting responses. The painting factors include the control settings of the painting equipment. The painting responses include such painting attributes as the appearance of the paint and application attributes of the paint. A database engine determines the values for the painting responses based upon the model and upon initially selected painting factor values. A cooptimizer uses the output of database engine to determine a second set of values for the painting factors which achieve the desired painting attributes. Thereupon, the painting equipment is controlled based upon the painting factor values as determined by the cooptimizer.

46 Claims, 15 Drawing Sheets

STANDARD METHOD OF CO-OPTIMIZATION
"STACKING" OF CONTOUR PLOTS

PAINT IDENTIFICATION NO. _____

FACTORS STUDIED:

| | FACTOR LEVELS/CHOICES |
|---|---|
| BELL SPEED: | 30K - 40K RPM |
| SHAPING AIR: | 28 - 36 PSI |
| BELL FLUIDS: | 220 - 300 CC/MIN |

FACTOR SETTINGS

| BELL SPEED | SHAPING AIR | BELL FLUIDS |
|---|---|---|
| 40 | 30 | 295 |

*APPEARANCE RESPONSE RESULTS*

| | GLOSS-H | DOI-H | PEEL-H | GLOSS-V | DOI-V | PEEL-V | OAR-H | OAR-V |
|---|---|---|---|---|---|---|---|---|
| | 73.39 | 77.89 | 73.35 | 66.05 | 71.94 | 57.66 | 76.72 | 65.09 |
| R-SQ. (ADJ) | 55.5% | 54.2% | 45.5% | 79.0% | 77.8% | 19.3% | 46.2% | 62.3% |

*APPLICATION RESPONSE RESULTS*

| | AVG. FILMBUILD | BELL PATTERN WIDTH (INCHES) | % VARIAT. IN PATTERN | POP VALUE |
|---|---|---|---|---|
| | 0.71 | 25.24 | 4.50 | -0.6 |
| R-SQ. (ADJ) | 80.5% | 90.7% | 69.4% | 72.4% |

POP RATING: 1-5 RATING
(5 = FAILURE)

| | BELL SPEED | SHAPING AIR | BELL FLUIDS |
|---|---|---|---|
| FACTOR LEVELS/CHOICES | 30K - 40K RPM | 28 - 36 PSI | 220 - 300 CC/MIN |

FACTORS STUDIED:
- BELL SPEED:
- SHAPING AIR:
- BELL FLUIDS:

FACTOR SETTINGS

| BELL SPEED | SHAPING AIR | BELL FLUIDS |
|---|---|---|
| 40 | 30 | 295 |

APPEARANCE RESPONSE RESULTS

| | GLOSS-H | DOI-H | PEEL-H | GLOSS-V | DOI-V | PEEL-V | OAR-H | OAR-V |
|---|---|---|---|---|---|---|---|---|
| | 73.39 | 77.89 | 73.35 | 66.05 | 71.94 | 57.66 | 76.72 | 65.09 |
| R-SQ. (ADJ) | 55.5% | 54.2% | 45.5% | 79.0% | 77.8% | 19.3% | 46.2% | 62.3% |

APPLICATION RESPONSE RESULTS

| | AVG. FILMBUILD | BELL PATTERN WIDTH (INCHES) | % VARIAT. IN PATTERN | POP VALUE |
|---|---|---|---|---|
| | 0.71 | 25.24 | 4.50 | -0.6 |
| R-SQ. (ADJ) | 80.5% | 90.7% | 69.4% | 72.4% |

POP RATING: 1-5 RATING (5 = FAILURE)

Figure - 6

| | D | E |
|---|---|---|
| 1 | | |
| 2 | | |
| 3 | | |
| 4 | | |
| 5 | | |
| 6 | | |
| 7 | | |
| 8 | | |
| 9 | | |
| 10 | BELL FLUIDS | |
| 11 | 295 | |
| 12 | | |
| 13 | DOI-H | PEEL-H |
| 14 | | |
| 15 | =72.546+0.0077615*(B11)^2-0.000599535*(B11*D11) | =71.1084+0.0355215*(B11)^2+0.000591046*(D11)^2-0.00898557*(B11*D11) |
| 16 | 0.5421 | 0.4511 |
| 17 | | |
| 18 | | |
| 19 | | |
| 20 | | BELL PATTE |
| 21 | | =63.755-3.2912*(B11)+0.06625*(D11)+0.062*(B11)^2-0.0218373*(B11*C11) |
| 22 | | |
| 23 | | |
| 24 | | |

PAINT IDENTIFICATION NO. _____

FACTORS STUDIED:

| | FACTOR LEVELS/CHOICES |
|---|---|
| BELL SPEED: | 30K - 40K RPM |
| SHAPING AIR: | 28 - 36 PSI |
| BELL FLUIDS: | 220 - 300 CC/MIN |

FACTOR SETTINGS

| BELL SPEED | SHAPING AIR | BELL FLUIDS |
|---|---|---|
| 40 | 30 | 240 |

APPEARANCE RESPONSE RESULTS

| | GLOSS-H | DOI-H | PEEL-H | GLOSS-V | DOI-V | PEEL-V | OAR-H | OAR-V |
|---|---|---|---|---|---|---|---|---|
| | 74.97 | 79.21 | 75.73 | 67.42 | 73.13 | 57.66 | 76.72 | 66.04 |
| R-SQ. (ADJ) | 55.5% | 54.2% | 45.5% | 79.0% | 77.8% | 19.3% | 46.2% | 62.3% |

APPLICATION RESPONSE RESULTS

| | AVG. FILMBUILD | BELL PATTERN WIDTH (INCHES) | % VARIAT. IN PATTERN | POP VALUE |
|---|---|---|---|---|
| | 0.66 | 21.48 | 9.39 | 0.9 |
| R-SQ. (ADJ) | 80.5% | 90.7% | 71.3% | 72.4% |

POP RATING: 1-5 RATING (5 = FAILURE)

PAINT IDENTIFICATION NO. _____

| FACTORS STUDIED: | FACTOR LEVELS/CHOICES |
|---|---|
| BELL SPEED: | 30K - 40K RPM |
| SHAPING AIR: | 28 - 36 PSI |
| BELL FLUIDS: | 220 - 300 CC/MIN |

FACTOR SETTINGS

| BELL SPEED | SHAPING AIR | BELL FLUIDS |
|---|---|---|
| 38 | 36 | 295 |

APPEARANCE RESPONSE RESULTS

| | GLOSS-H | DOI-H | PEEL-H | GLOSS-V | DOI-V | PEEL-V | OAR-H | OAR-V |
|---|---|---|---|---|---|---|---|---|
| | 72.31 | 77.03 | 73.11 | 65.01 | 71.13 | 55.35 | 75.19 | 63.28 |
| R-SQ. (ADJ) | 55.5% | 54.2% | 45.5% | 79.0% | 77.8% | 19.3% | 46.2% | 62.3% |

APPLICATION RESPONSE RESULTS

| | AVG. FILMBUILD | BELL PATTERN WIDTH (INCHES) | % VARIAT. IN PATTERN | POP VALUE |
|---|---|---|---|---|
| | 0.94 | 18.48 | 7.33 | 0.8 |
| R-SQ. (ADJ) | 80.5% | 90.7% | 71.3% | 72.4% |

POP RATING: 1-5 RATING (5 = FAILURE)

PAINT EQUIPMENT SET-UP METHOD AND APPARATUS

BACKGROUND OF THE INVENTION

1. Field of the Invention

The present invention relates generally to painting equipment and more particularly to painting equipment controllers for automotive painting applications.

2. Description

While the theory of automotive paint chemistry and its application to various substrates has advanced considerably in the past decade, the bulk of that knowledge has rigidly stayed within the laboratory. Only a small portion of that laboratory knowledge has permeated the automotive plant environment. This has mainly resulted from the abstruse nature of the laboratory-derived knowledge and the requirement that the scientist or technical expert must be integrally involved in applying the theoretical knowledge.

Scientists in the laboratories have performed complex design of experiments to study the interrelationships between painting factors and painting responses. Their work has produced mathematical models which are typically very intricate so as to require three-dimensional depictions of the interrelationships (as shown for example in FIG. 1).

The various surfaces in FIG. 1 show an exemplary interrelationship between three painting factors and one painting response. The painting factors may be the settings of the painting spray gun, such as bell speed, shaping air, and bell fluids. The painting response may be an attribute of the sprayed paint, such as paint's gloss value. FIG. 1 illustrates how changes in the painting factors affect the painting response. For example, surface 20 shows what parameters of the painting factors produce a response value of "30". As shown in FIGS. 2a–2b, contour plots can be used to depict interrelationships between painting factors and a painting response in a two-dimensional view.

To use the experimental results in the automotive plant, the contour plots were studied to determine the optimal painting factor which would achieve a particular painting response. To determine what were the painting factors needed to achieve a desired level for two painting responses, the contour plots for two painting responses were placed on top of each other (see FIG. 2c); thereupon painting factors were determined based upon the area common to both desired painting response levels. The difficulty for analyzing the contour plots dramatically increases with the number of painting factors and responses involved.

The design of experiments approach was not used within the ever-changing plant environment when the painting factors and responses had to be changed from the initial laboratory-determined set of optimal painting factors. The unwieldy manner of the contour plots to effectively address the ever-changing painting factors and responses within the plant environment hindered their ability to assist in modifying the painting factors. Accordingly, modifications to the painting factors within the plant to achieve desired painting responses was an art form. This art form was to be learned from years of experience in controlling the painting equipment within the automotive plant. Due to these reasons, the automotive plant environment lacks the design of experiments approach for controlling paint equipment, especially for realtime or near-realtime control in reacting to changes in the plant environment or to changes in the painting equipment itself.

SUMMARY OF THE INVENTION

The present invention is a painting equipment controller for controlling painting equipment so that a predetermined desired level of a painting response is produced. The controller includes a database which stores a painting factor-response model. The model interrelates at least one predetermined painting factor with the painting response. The painting factors have levels which are indicative of setting values for controlling the painting equipment. Also, a database engine is connected to the database for determining a level for the painting response based upon the model and upon a first predetermined level of the painting factors. A cooptimizer is connected to the database engine for determining a second level of the painting factors which produces the desired level of the painting response based upon the determined level of the painting response from the database engine. After the cooptimizer has made that determination, the painting equipment is controlled based upon the determined second level of the painting factors which produced the desired level of the painting response.

The present invention also includes a memory for storing data for access by the painting equipment controller which is executed on a data processing system. A painting factor data structure is stored in the memory and has access to information stored in the database which has the factor-response models. The painting factor data structure includes painting factor type data and painting factor value data. Also, a painting response data structure is stored in the memory and has access to the information stored in the database. The painting response data structure includes painting response type data and painting response value data. The painting response type data has a functional interrelationship with the painting factor type data. The painting response value data is determined based upon the painting response factor data and upon the int relationship.

BRIEF DESCRIPTION OF THE DRAWINGS

Additional advantages and features of the present invention will become apparent from the subsequent description in the appended claims, taken in conjunction with the accompanying drawings in which:

FIG. 3b is an exemplary screen display of the present invention wherein painting factors and responses are shown;

FIG. 5 is a screen display that shows the cell location identifiers for the screen display of FIG. 3b;

FIG. 6 is a screen display showing the formula values of several cells contained within the screen display of FIG. 5;

FIG. 7 is a screen display where the painting factor settings have been modified;

FIGS. 9a–9b are screen displays showing a cooptimizing technique with respect to painting factors and painting responses.

DESCRIPTION OF THE PREFERRED EMBODIMENT

Figure 1:
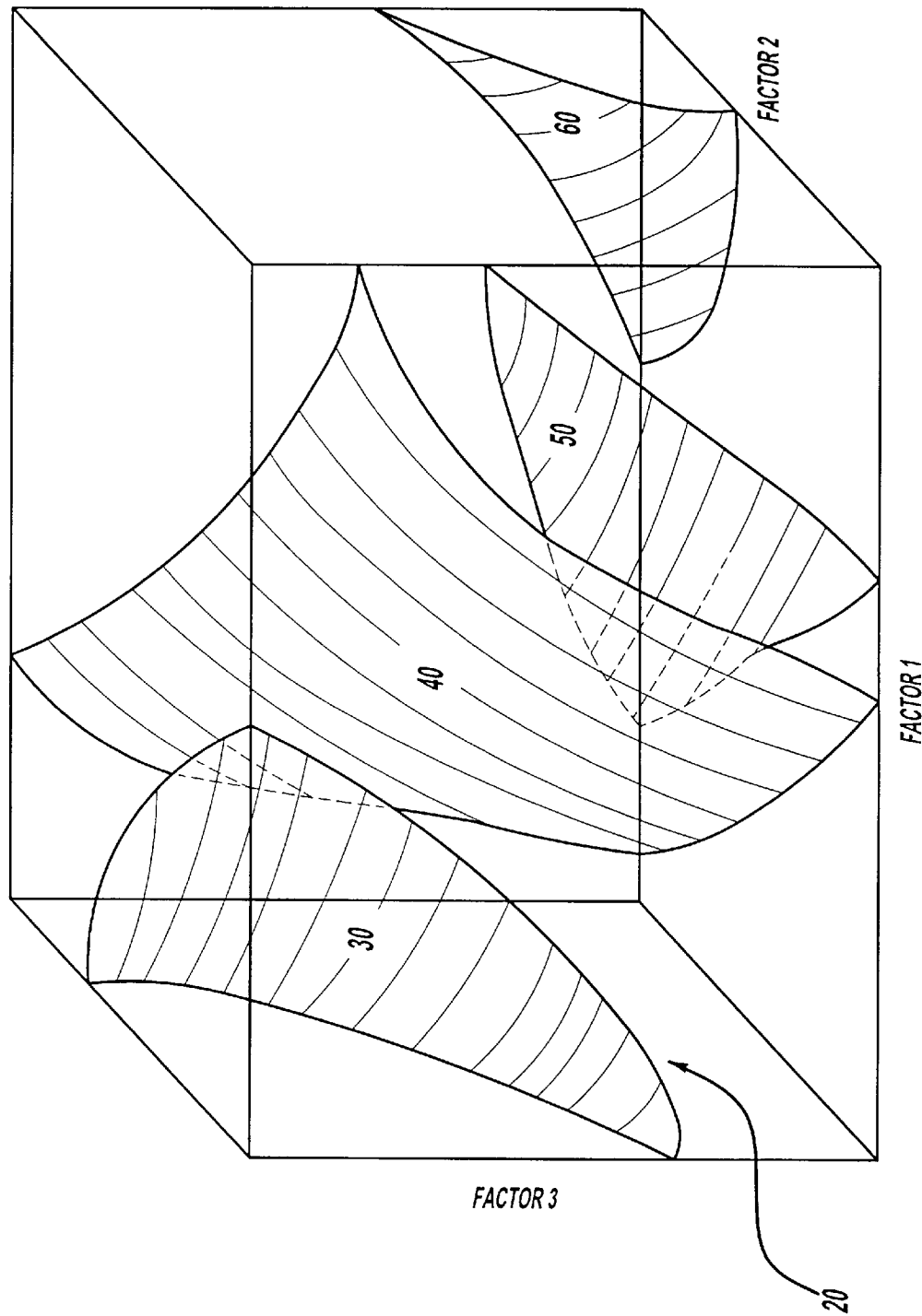
FIG. 1 is a three-dimentional graph depicting several painting factor-response graphs as used the conventional painting art.
Figure 2A:
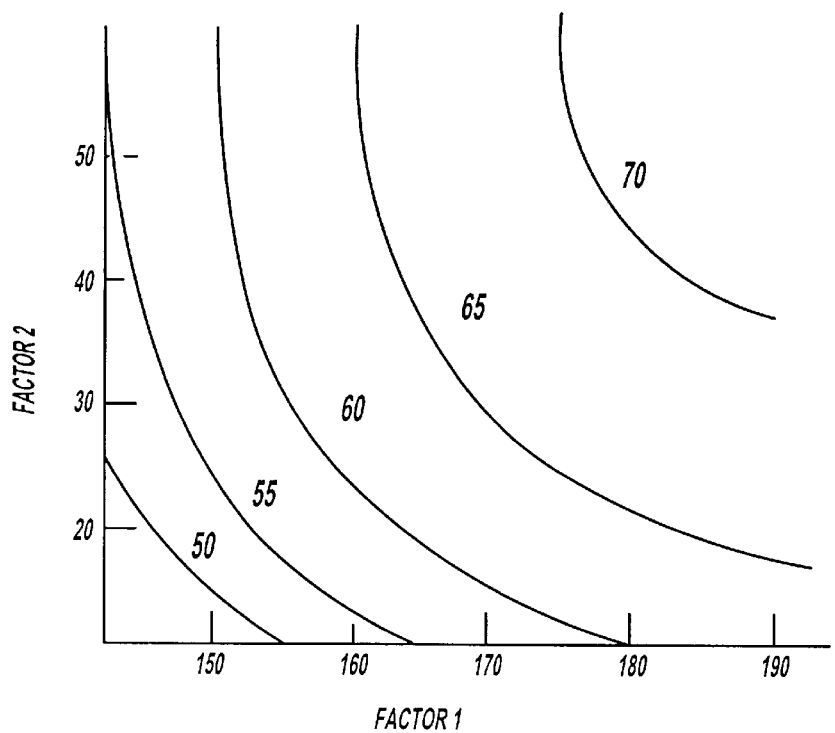
FIGS. 2a, 2b, and 2c are contour plots of painting factor-response interrelationships as used in the conventional painting art.
Figure 2B:
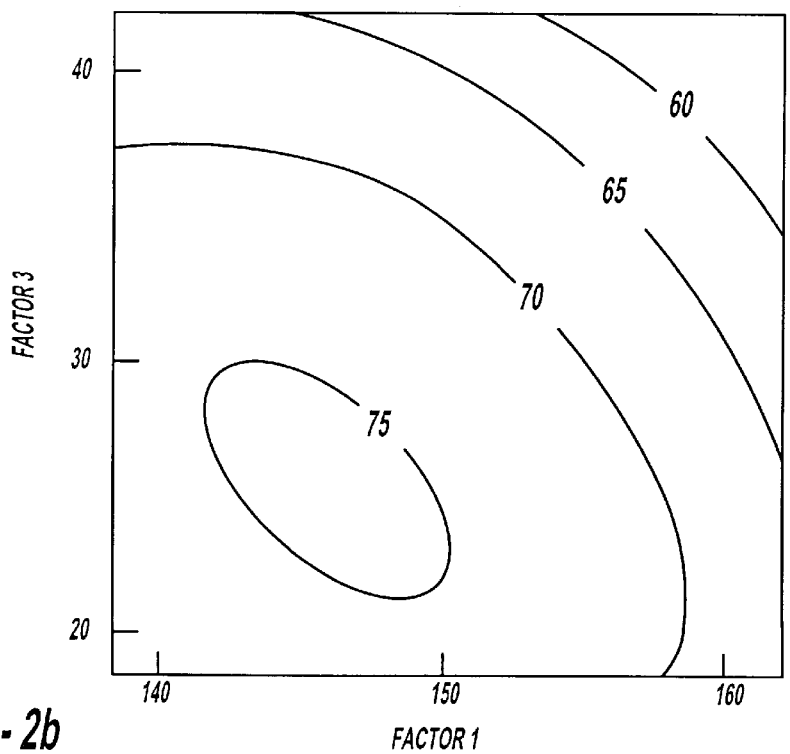
Figure 2C:
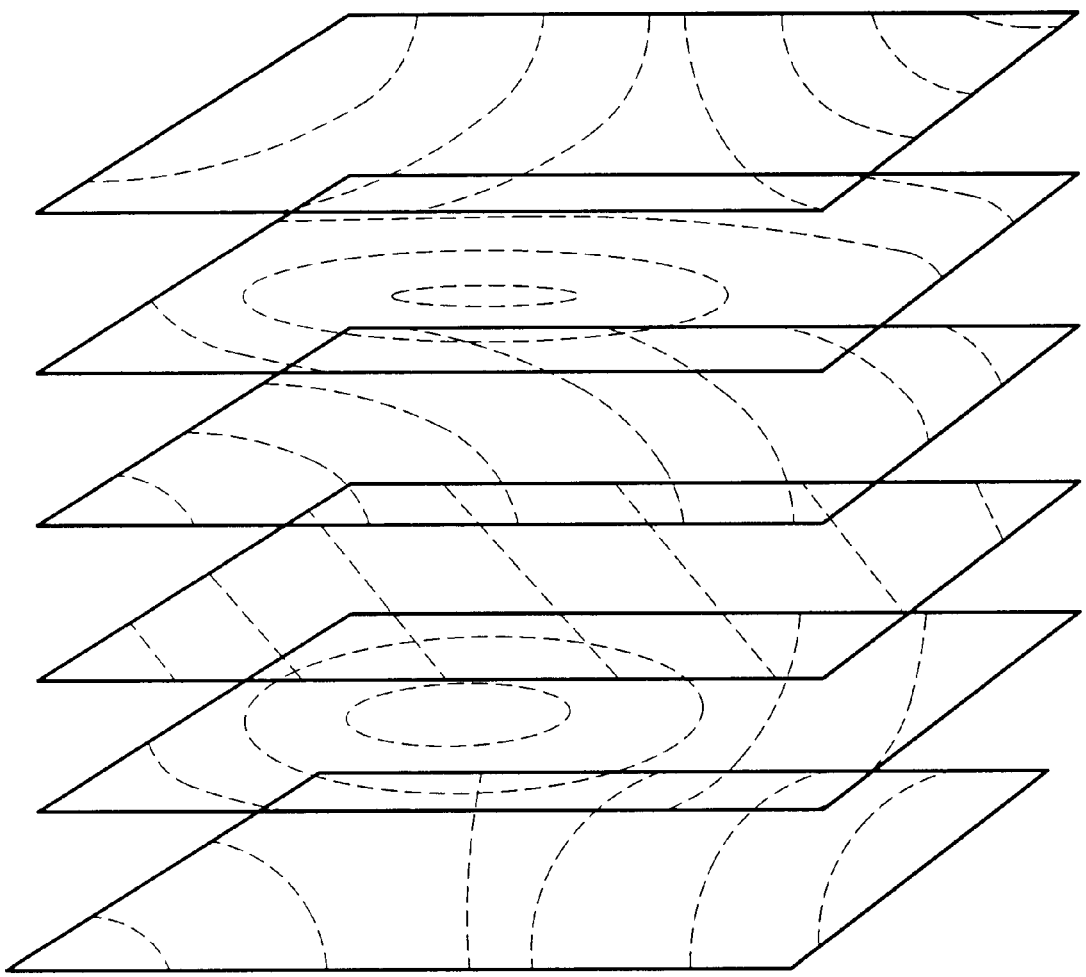
Figure 3A:
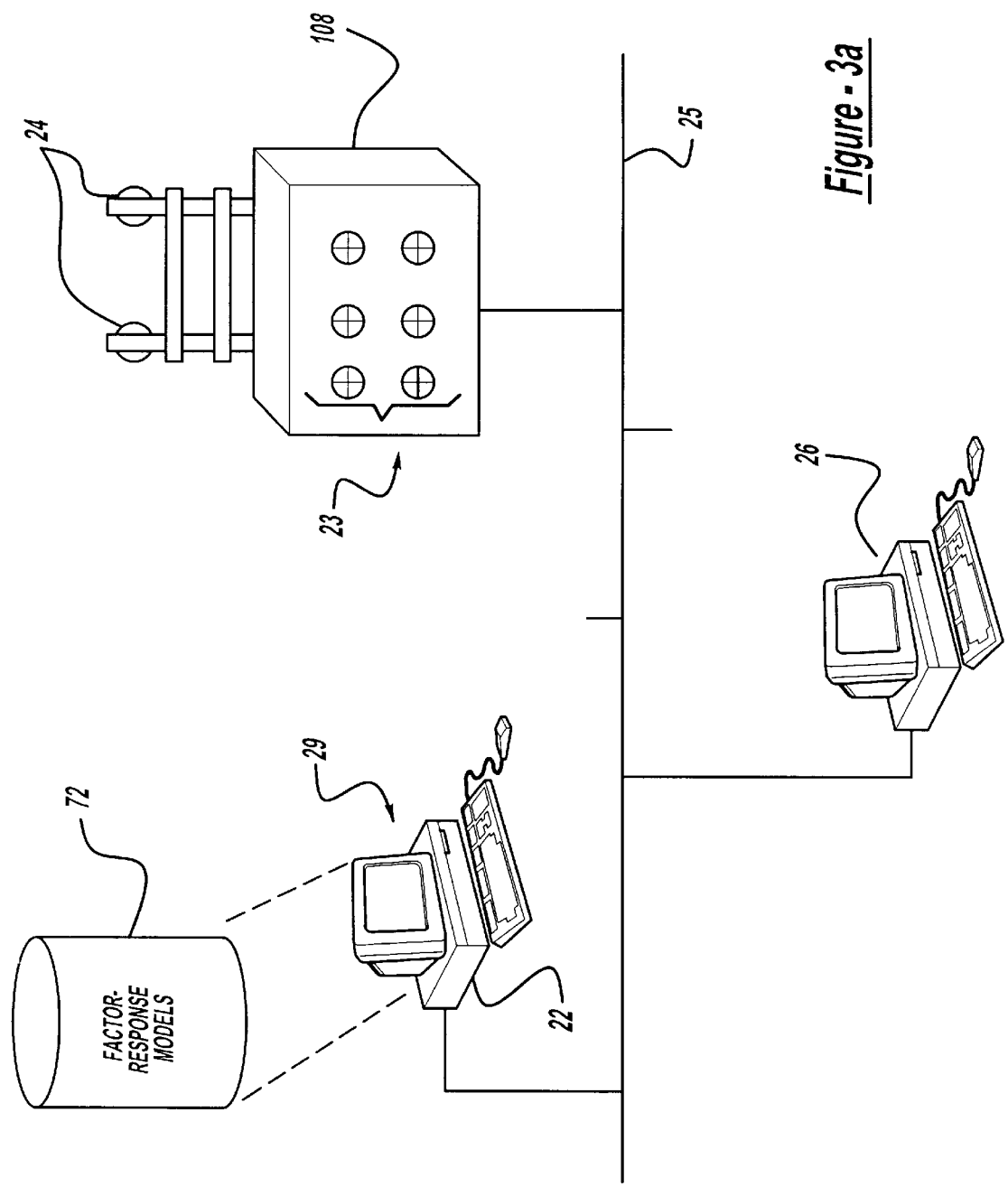
FIG. 3a is a schematic diagram showing the cooptimizing computer and the painting equipment.

FIG. 3a shows the painting equipment 108 and its interface with a painting equipment controller. The painting equipment controller includes a first computer 22 which is capable of determining values for the control settings 23 of the painting equipment 108. The control settings 23 determine how the spray guns 24 spray paint upon the vehicles in an auto assembly line. The painting equipment 108 and its spray guns 24 are obtainable from such companies as Binx-Sames or ITW DeVilbiss.

The control settings 23 have associated with them painting factors which are calculated by the first computer 22 based upon factor-response models 72 and upon desired painting responses. The first computer 22 includes a computer-human interface 29 for specifying levels for painting factors and painting responses. The user of the computer-human interface 29 adjusts the control settings 23 of the painting equipment 108 based upon the calculated painting factor values from the first computer 22.

In another embodiment, a data communication link 25 can be used to provide data communication between the first computer 22 and a second computer 26. The second computer 26 which is part of the painting equipment controller is used to directly control the control settings 23 based upon the calculated painting factors from the first computer 22. Still another embodiment provides that the user of the first computer 22 enters into the second computer 26 the calculated painting factors from the first computer 22.

FIG. 3b shows the preferred embodiment for the computer-human interface (generally at 29) of the present invention. The computer-human interface displays factors 30 and responses 34. The responses 34 are calculated based upon the factors 30. A user (or a computer program which is coupled to the computer-human interface) can modify the level for each of the factors 30 in order to determine the modification's effect upon the responses 34.

For this example, the factors 30 include the bell speed, shaping air, and bell fluids for a painting spray gun. A design of experiments was priorly conducted in order to interrelate the factors 30 with the responses 34. The design of experiments can be conducted as described in G.E.T. Box, W. G. Hunter, and J. S. Hunter, *Statistics For Experimenters*, John Wiley and Sons, Inc., New York, 1978 (see particularly, pages 291–373).

For convenience of the users, the preferred embodiment shows on the computer-human interface the particular factors and their ranges which were studied in the design of experiments. Box 38 provides these studied factor levels. For this particular example, the range for the bell speed factor was from 30,000 to 40,000 revolutions per minute (RPM). The range for the shaping air factor was from 28 to 36 p.s.i. The range for the bell fluids factor was from 220 to 300 cubic centimeters per minute (cc/min). A design of experiments was conducted that varied the factors 30 over their respective ranges while paint was sprayed upon substrates. The responses 34 were measured after the paint was sprayed upon the substrates. The measured factors 30 were then interrelated with the measured responses 34 to produce the factor-response models 72.

Box 38 provides the ranges for the factor levels selected for the design of experiments. It is desirable for the user to stay within the ranges examined by the design of experiments. The preferred embodiment uses the centerpoints for each of the painting factor ranges as initial values. The user can then modify the painting factors from their centerpoint values.

Factor values which are outside of the ranges indicated in box 38 may provide less reliable results since those values would be outside of the ranges contemplated for this particular example. However in the preferred embodiment, those painting responses whose R-squared (adjusted) values are 90% or above may have their associated painting factors go beyond their respective experimental ranges. Lastly, paint identification information can be entered at location 42 in order to associate such information as the particular paint material with the factors 30 and the responses 34.

It is to be understood that FIG. 3 shows only an exemplary list of factors 30 and responses 34. The present invention includes, but is not limited to, other factors and responses. For example, the factors may include such paint process variables as the following: painting booth temperature; booth humidity; booth down/side-draft; circulation temperature; circulation flowrate/pressure; IR electrical settings; convection air flow (FPM); convection air temperature; flash time; bake time/temperature; bake ramp (degree Fahrenheit per minute); line speed; bell cup design; equipment type/manufacturer; equipment target distance; bell speed (RPM); voltage; film splits (i.e., first coat/second coat); reciprocator fluids; reciprocator tip speed; percent overlap; gun/cap/nozzle design; fluid delivery; shaping air; and atomizing air.

Other painting factors include such product properties as: viscosity; percentage nonvolatile; application temperature; ingredient types/levels; technology/chemistry (such as waterborn or pure solvent-based chemistry); raw material supplier; supplier plant/location; production equipment type/manufacturer; manufacturing dwell time; number/amount of adjustments; shear history; processing temperature; and storage time/temperature.

The painting responses may include such paint attributes as the following paint appearance attributes: gloss-horizontal; gloss-vertical; distinctness of image-horizontal (DOI-H); DOI-vertical; peel-horizontal; peel-vertical; OAR-horizontal (this response is based upon gloss, DOI, and peel responses); OAR-V; color appearance responses (such as, L, a, b color values) etc. Also, the responses may include such paint application responses as: average film build; bell pattern width; percentage variation in the pattern; pop value; sag value; pinholing value; etc.

For the preferred embodiment, the R-squared (adjusted) value is given for each of the responses in order to indicate how well the model predicts the responses 34 based upon the factors 30. For the preferred embodiments, an R-squared (adjusted) value of 70% or higher is used to determine which responses are adequately described by model. It is to be understood that the present invention is not required to display the R-squared (adjusted) value nor is it limited to only the R-squared (adjusted) statistical information being provided, but also includes other types of statistical information which indicates how well the model addresses the responses 34.

Figure 4A:
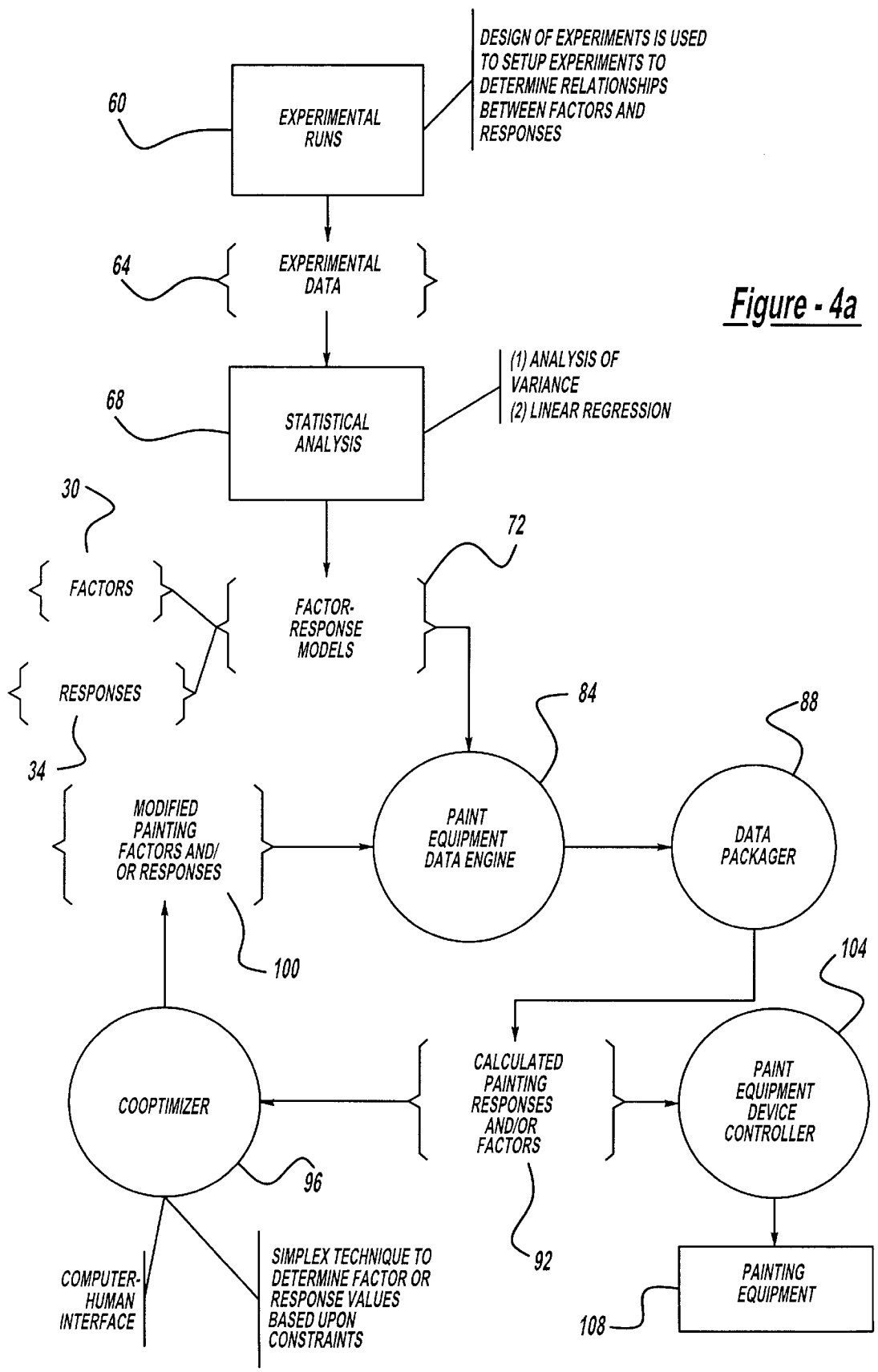
FIG. 4a is an entity relationship diagram which depicts the interrelationship of the various components of the present invention.

FIG. 4a is an entity relationship diagram which shows the interrelationships among the various components of the present invention as well as the processing flow models. Block 60 indicates that hexperimental runs are conducted to produce experimental data 64 for building the models. The experimental runs are designed to address each of the factors and responses which are needed to control the paint equipment 108 in a predetermined desired manner. The design of experiments statistical technique is used to set up the experiments which, when completed and analyzed, establish the relationships between the factors and responses.

Block 68 indicates the statistical analysis that is performed upon the experimental data 64 and includes, for the preferred embodiment, performing an analysis of variance as well as linear regression upon the experimental data 64. This statistical analysis produces the factor-response models 72.

The factor-response models 72 provide the interrelationships between the factors 30 and the responses 34. Using the factor-response models and an initial level for the factors 30, a paint equipment data engine 84 calculates the values of the responses and provides them to a data packager 88. The data packager 88 assembles the response values calculated by the paint engine data engine 84 in such a way that the calculated painting factors and painting responses 92 are "understandable" by the recipients of the information. Such recipients include a cooptimizer 96 and a paint equipment device controller 104.

The cooptimizer 96 a adjusts various painting factor levels and/or painting response levels in order to achieve a predetermined desired level of a painting factor level and/or painting response level. The cooptimizer 96 provides painting factor level and/or painting response level modifications 100 to the paint equipment data engine 84. These modifications 100 include, but are not limited to, modified painting factor levels, modified painting response levels, constraints on the permissible painting factor levels, and constraints on the permissible painting response levels. The cooptimizer 96 may use a computer-human interface to provide the modifications 100 to the paint equipment data engine 84. The cooptimizer 96 may also use in an alternative embodiment a simplex mathematical technique to calculate the modifications 100. The preferred embodiment of the cooptimizer 96 uses both the computer-human interface and the simplex technique to provide the modifications 100 to the paint equipment data engine 84.

After the painting factor levels and/or painting response levels have been cooptimized, the painting factor levels are provided to the paint equipment device controller 104 which then controls the paint equipment 108 in accordance with those levels.

In the preferred embodiment, the paint equipment device controller 104 receives the calculated painting factors from the present invention via controller software, such as is available from the AEG company. In the preferred embodiment, the AEG co controller software has access to the calculated painting factors. One embodiment has a user directly entering the painting control factors which were determined by the cooptimizer 96 into the AEG controller software. Another embodiment provides a data communication link between the AEG controller software and the present invention so that data generated by the present invention can be transferred to the AEG controller software.

However, it is to be understood that the present invention is not limited to this embodiment, but includes such other embodiments as having the present invention place the calculated painting factors in a data file or a data table which is read by the paint equipment device controller 104.

Figure 4B:
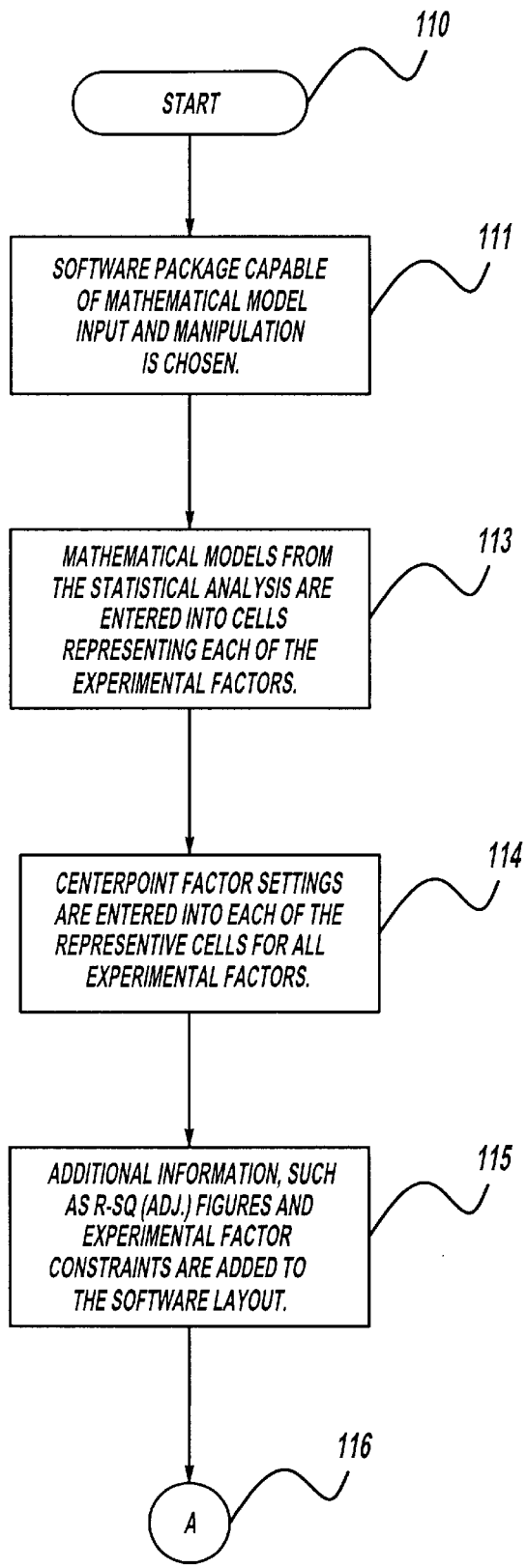
FIGS. 4b–4c are flowcharts depicting the steps for determining the painting factors used to control the painting equipment.
Figure 4C:
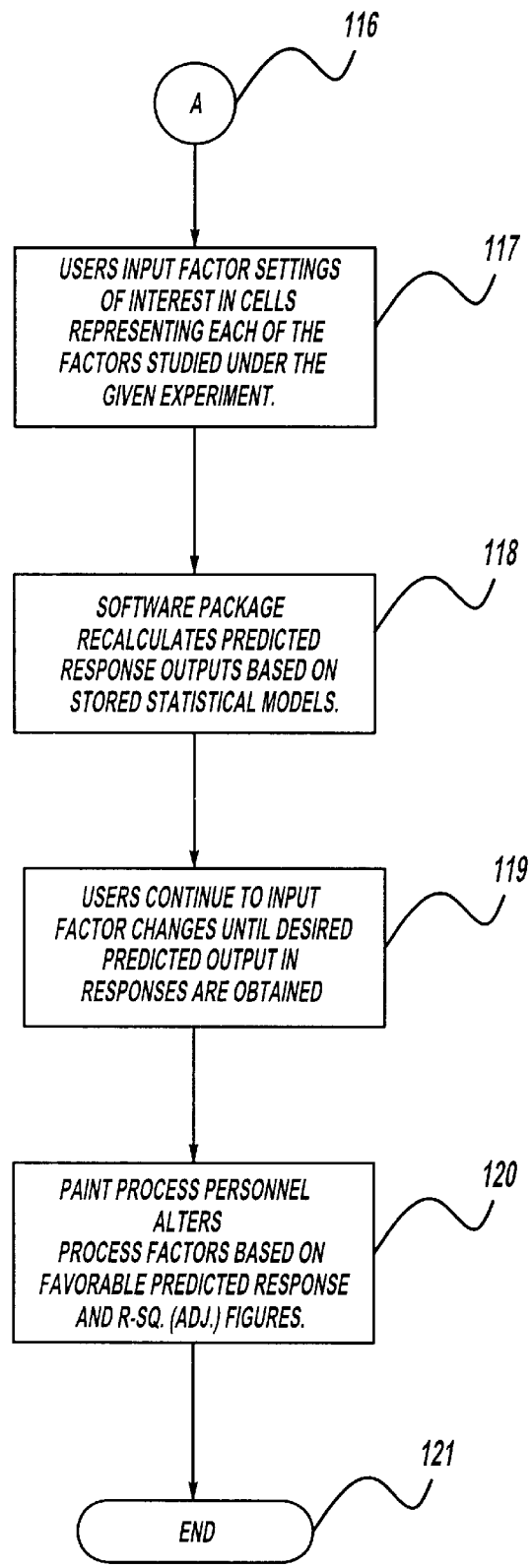

FIGS. 4b–4c show flowcharts depicting the steps for calculating the painting factors needed to achieve desired painting responses. Referring to FIG. 4b, start block 110 indicates that block 111 is to be executed. At block 111, a software package capable of mathematical model input and manipulation is brought up on the computer screen of the user. For the preferred embodiment, Microsoft Excel is chosen.

At block 113, mathematical models from the statistical analysis (i.e., past design of experiments efforts) are entered into the Microsoft Excel spreadsheet cells. The mathematical models represent each of the painting responses studied during the design of experiments. At block 114, centerpoint settings of each of the factors are entered into each of painting factor cells. At block 115, additional information, such as R-square (adjusted) values and experimental factor ranges are added to the computer screen. Processing continues at continuation block A 116.

Referring to FIG. 4c, continuation block A 116 indicates that block 117 is to be executed. At block 117, the user modifies the factor settings of interest. At block 118, the software package recalculates the predicted response outputs based on stored statistical models. At block 119, the user continues to input painting factor changes until the desired predicted output in responses are obtained. At block 120, the paint process personnel alters the process factors (i.e., the control settings) of the painting equipment. Processing terminates at termination block 121.

FIG. 5 shows the spreadsheet cell location identifiers for the screen display of FIG. 3b. The column identifiers are generally indicated at 130. The row identifiers are generally indicated at 134. The combination of the column identifiers and the row identifiers uniquely identifies each entry on the computer screen of FIG. 5. These identifiers are used in the preferred embodiment to perform such calculations as those determined by the factor-response models. However, it is to be understood that the present invention is not limited to this particular embodiment, but includes using other approaches to perform the calculations based upon the models. These other approaches include using non-spreadsheet software tools, such as the Microsoft Access Relational Database Management System in order to perform the calculations. Still another way is to use other computer languages in order to perform the calculations, such as a FORTRAN computer program.

In the preferred embodiment, the painting factor level contains values at predetermined spreadsheet cell locations. For example, the bell speed value of "40" is at spreadsheet cell location B11 as indicated at location 138. Also for example, the bell fluids value of "295" is provided at the spreadsheet cell location of D11 as indicated at location 142. Lastly, the value for the painting response of DOI-H which is "77.89" is at the spreadsheet cell location D15 as indicated at location 146. The following provides a listing of the painting factors in FIG. 5:

B11=Bell Speed="40"

C11=Shaping Air="30"

D11=Bell Fluids="295"

The following provides a listing of the painting responses in FIG. 5:

C15=Gloss-H="73.39"

D15=DOI-H="77.89"

E15=Peel-H="73.35"

F15=Gloss-V="66.05"

G15=DOI-V="71.94"

H15=Peel-V="57.66"

I15=OAR-H="76.72"

J15=OAR-V="65.09"

C20=Average Filmbuild="0.71"

E20=Bell Pattern Width (inches)="25.24"

H20=% Variation in Pattern="4.50"

J20=Pop Value="−0.6"

FIG. 6 shows a computer screen which reveals the formula expressions for several of the cells that were shown on FIG. 5. Specifically, the formula for the DOI-H painting response is shown within spreadsheet cell D15 at location 146. The formula for spreadsheet cell D15 at location 146 is:

$$72.546 + 0.00776151 \times (B11)^2 - 0.000599535 \times (B11 \times D11)$$

B11 and D11 are used within that formula to refer to the painting factor values of the bell speed painting factor and the bell fluids painting factor (which respectively are at location 138 and location 142 on FIG. 5).

The formula at location 146 was determined by a design of experiments which studied, in part, the interrelationship between the bell speed painting factor and the bell fluid painting factor with the DOI-H painting response. Modifications to the bell speed painting factor and the bell fluid painting factor correspondingly change the DOI-H painting response according to the formula at location 146. The following is a list of the formulas used in FIG. 5:

C15 = Gloss-H =
    66.39 + 0.00967003*(B11)^2 - 0.000717888*(B11*D11)
D15 = DOI-H =
    72.546 + 0.00776151*(B11)^2 - 0.000599535*(B11*D11)
E15 = Peel-H =
    71.1084 + 0.0355215*(B11)^2 + 0.000591046*
    (D11)^2 - 0.00898557*(B11*D11)
F15 = Gloss-V =
    52.7024 + 0.5178*(B11)-0.024975*(D11)
G15 = DOI-V =
    62.0129 + 0.4072*(B11)-0.02155*(D11)
H15 = Peel-V =
    19.3153 + 2.44122*(C11) + 0.0317729*(B11)^2 -
    0.0714421*(B11*C11)
I15 = OAR-H =
    133.276-3.71087*(B11) + 0.0574267*(B11)^2
J15 = OAR-V =
    44.1356 + 1.26323*(C11)-0.0173*(D11) +
    0.0203483*(B11)^2 - 0.0369994*(B11*C11)
C20 = Average Filmbuild =
    -2.70744 + 0.188153*(B11)-0.00305333*(B11)^2 +
    0.000411889*(B11*C11) + 0.0000323845*(C11*D11)
E20 = Bell Pattern Width (inches) =
    63.755 - 3.2912*(B11) + 0.06825*(D11) + 0.062*
    (B11)^2 - 0.0218373*(B11*C11)
H2O = % Variation in Pattern =
    -137.903 + 10.7953*(C11) + 0.00161494*(D11)^2 - 0.0340872*
    (B11*C11)-0.0317616*(C11*D11)
J20 = Pop Value =
    22.7723 + 0.185199*(D11) + 0.0355602*(B11)^2 - 0.0281077*
    (C11)^2 - 0.0435004*(B11*C11)-0.0052914*(D11*B11)

An example of painting factor and response modification is shown in FIG. 7 wherein the bell fluids painting factor value has been decreased from a value of 295 down to a value of 240. The modification changes the DOI-H value in accordance with the formula as shown on FIG. 5 at location 146.

The computer-human interface as shown in FIG. 7 can be used to modify the painting factor level so as to achieve a desired level for one or more painting responses. For the preferred embodiment, a simplex mathematical technique is used to assist the user in optimizing the painting response levels along with the painting factor levels (i.e., performing a cooptimization).

Figure 8:
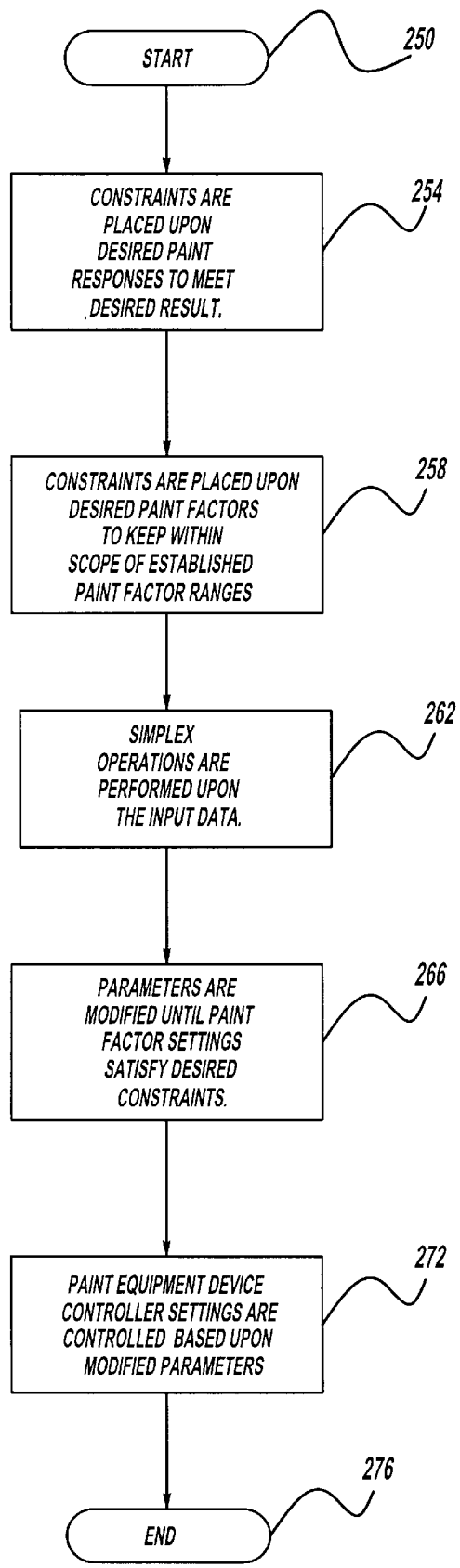
FIG. 8 is a flow chart depicting the steps for performing a cooptimizing technique upon the painting factors and responses.

FIG. 8 is a flow chart which provides the various steps for performing the simplex mathematical technique upon the painting factor and painting response information. Start block 250 indicates that block 254 is to be executed wherein constraints are placed upon the desired paint responses in order to meet a desired paint response result. Block 258 places constraints upon the desired painting factors in order to keep the painting factors within the scope of the constrained painting factor ranges.

Block 262 performs simplex mathematical operations upon the constraints, the painting factor values, and painting response values. At block 266, the parameters are modified until the painting factor and response settings satisfy the desired constraints. At block 272, the paint equipment device controller settings are controlled based upon the modified parameters. Processing stops at end block 276.

Figure 9A:
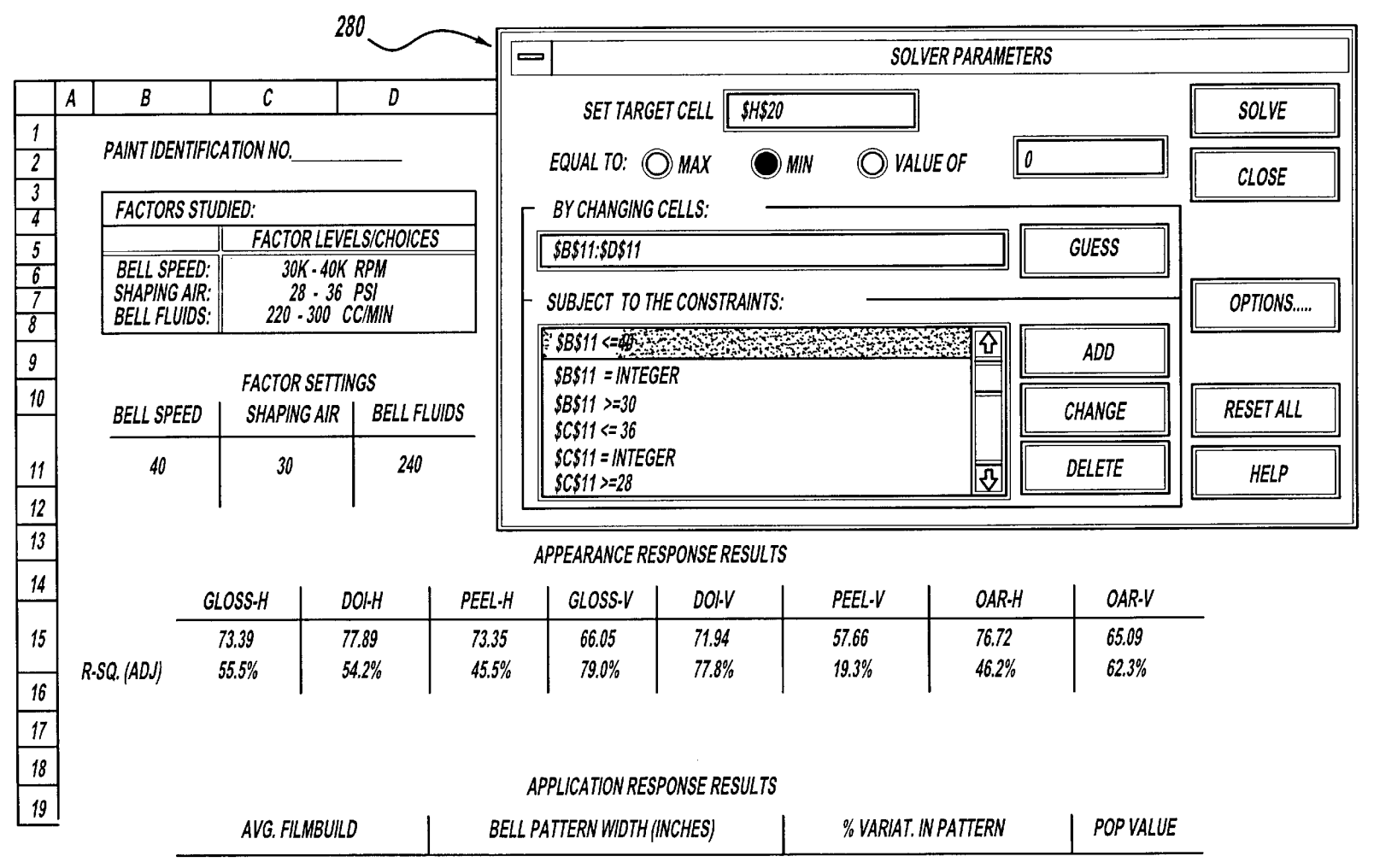

FIG. 9a is a screen display showing the preferred embodiment for using a simplex mathematical technique to perform the cooptimization. The preferred embodiment uses the Microsoft Excel Solver feature in order to perform the cooptimization. However, it is to be understood that the present invention is not limited to that embodiment, but includes other approaches for implementing a simplex mathematical technique within the computer environment. For example, the simplex mathematical technique could be implemented using a FORTRAN computer program that is able to read the various painting factor and painting response information. Moreover, other statistical packages (such as RS/1 from BBN Software Products Company and X-Stat from Wiley Professional Company) can be used for implementing the simplex mathematical technique.

The Microsoft Excel Solver feature provides a window 280 for specifying the various items of data needed to perform the simplex mathematical technique upon the painting factors and the painting responses. Window 280 allows the "target cells" to be specified wherein the target spreadsheet cells are the cells to be minimized, maximized, or set to a certain value. Window 280 also allows the "changing cells" to be specified. "Changing cells" are the cells to be adjusted until a solution is found. Also, window 280 allows the "constraint cells" to be specified. "Constraint cells" are the cells which are to fall within the prescribed limits or to satisfy the target values.

The following is an example of the cooptimization of painting factors and responses within the present invention. Suppose that in the plant the spray guns were not consistently spraying at the lower control setting of 30 p.s.i. of shaping air. The painting personnel wished to raise the control setting of the shaping air to 35 p.s.i. (at which control setting the spray guns have been able to consistently spray paint). The painting personnel wished to raise that painting factor while achieving four desired painting responses. The four desired painting responses are: an average filmbuild between 0.8 and 1.0; bell pattern width between 17.9 and 18.5; a pop value which is less than 1.5; and a minimum value for % variation in pattern.

The present invention is constrained to achieve those desired painting responses by setting the Microsoft Excel Solver parameters at the following values:

Establish the Target cell: $H$20 (which is the % variation in pattern) is set equal to the "minimum" constraint setting;

Establish the Changing cells: $B$ 11:$D$11 (i.e., allow the painting factor values to change);

Establish the following painting factor constraints for bell speed:

$B$11<=40

$B$11=Integer $B$11>=30

Establish the following painting factor constraints for shaping air:

$C$11<=36

$C$11=Integer $C$11>=35

Establish the following painting factor constraints for bell fluids:

$D$11<=300

$D$11=Integer $D$11>=220

Establish the following painting response constraints for average filmbuild:

$C$20<=1

$C$20>=0.8

Establish the following painting response constraints for bell pattern width:

$E$20<=18.5

$E$20>=17.9

Establish the following painting response constraints for pop value:

$J$20<=1.5

The Solver technique uses these constraints in combination with the equations particular for each painting response. The equation particular to average filmbuild for this example is:

$$C20 = \text{Average Filmbuild} = \\ -2.70744 + 0.188153*(B11) - 0.00305303*(B11)^2 - 0.000411889*(B11*C11) + 0.0000323845*(C11*D11)$$

The equation particular to bell pattern width is:

$$E20 = \text{Bell Pattern Width (inches)} = \\ 63.755 - 3.2912*(B11) + 0.06825*(D11) + 0.062*(B11)^2 - 0.0218373*(B11*C11)$$

The equation particular to pop value is:

$$J20 = \text{Pop Value} = \\ -22.7723 + 0.185199*(D11) + 0.0355602*(B11)^2 - 0.0281077*(C11)^2 - 0.0435004*(B11*C11) - 0.0052914*(D11*B11)$$

The equation particular to % variation in pattern is:

$$H2O = \%\text{ Variation in Pattern} = \\ -137.903 + 10.7953*(C11) + 0.00161494*(D11)^2 - 0.0340872*(B11*C11) - 0.0317616*(C11*D11)$$

For the preceding example, the following were the option values for the Solver:

max time=100 seconds iterations=100 precision=0.000001

Tolerance=5%

Estimates=Tangent

Derivatives=Forward

Search=Newton

With the Solver set up in the manner outlined above, the Solver operation determines a level for the painting factors that satisfied the four desired painting responses. The results of the Solver operation are shown in FIG. 9b. Consequently, the painting equipment is able to be set at the higher and more consistent shaping air level of 35 p.s.i. while achieving desired painting responses.

Moreover, it is to be understood that the term painting equipment is not to be limited to only that equipment which sprays the paint, but includes the painting equipment in the plant which also prepares the paint for being fed into the sprayer. Accordingly, the present invention can also establish the settings for such other painting attributes as viscosity of the paint which is fed into the spray painting equipment. For example, the viscosity painting factor can be cooptimized with such painting responses as sag or pop in the manner discussed above. In this way the material which is eventually fed into the spray painting equipment is prepared based upon the cooptimized painting factors and painting responses.

Figure 10:
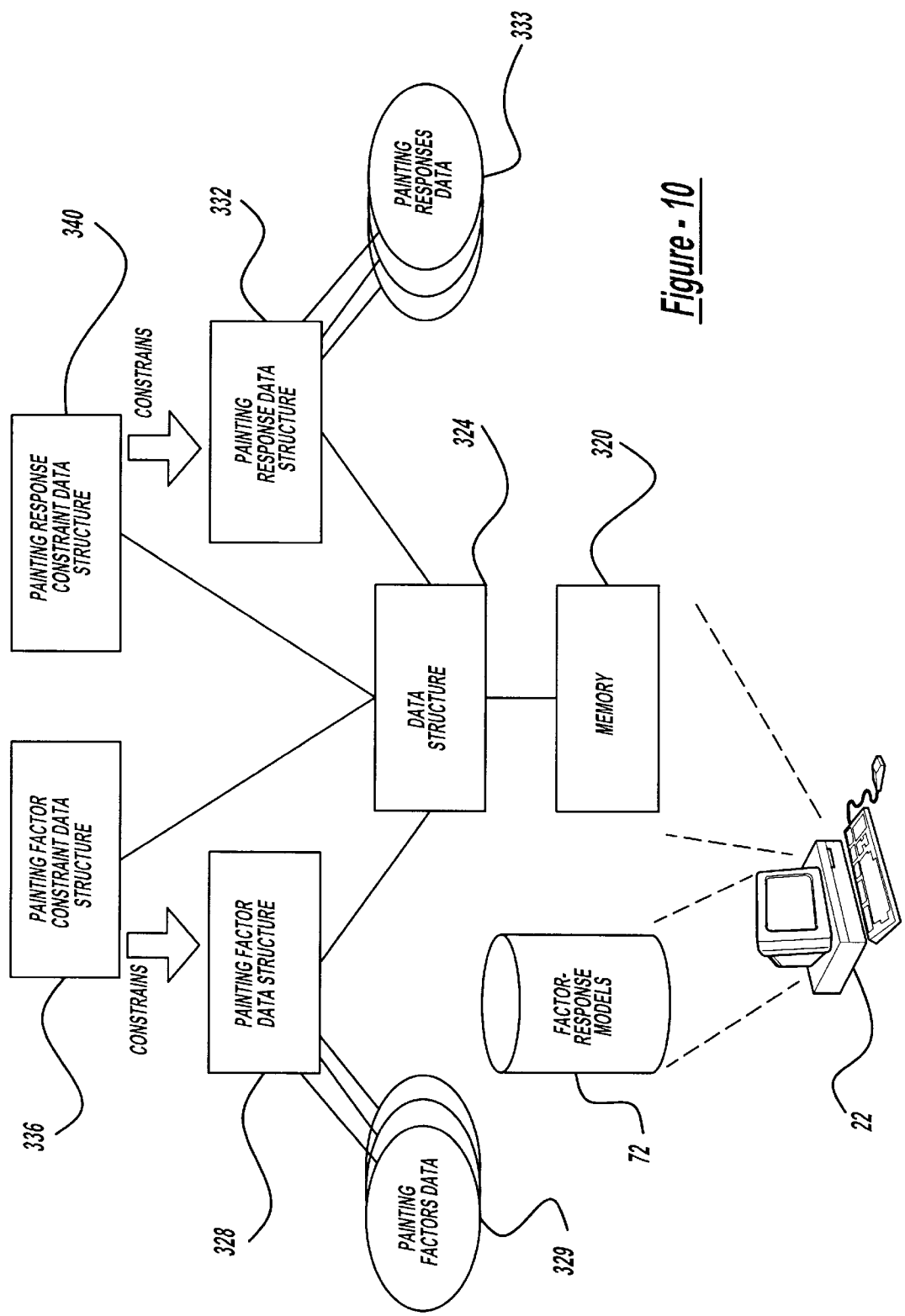
FIG. 10 is a schematic depicting the memory and data structure of the present invention.

FIG. 10 depicts the organization of memory in the present invention. The first computer 22 performs the painting factor and response calculations based upon the factor-response models 72. The calculated values are then used to set the control settings of the painting equipment so that the desired painting responses are achieved. The first computer 22 has a memory 320 which includes a data structure 324. Data structure 324 has a painting factor data structure 328 and a painting response data structure 332. Data structure 324 also includes a painting factor constraint data structure 336 and a painting response constraint data structure 340.

The painting factor data structure 328 and the painting response data structure 332 have access to the factor-response models 72 which are stored in a database. The painting factor data structure 328 includes painting factor type data which indicates what painting factor it is, such as bell speed. The painting factor data structure 328 also includes painting factor value data to hold the values for each type of painting factor in the painting factor type data. The painting factor type data and the painting factor value data is collectively termed painting factors data 329 and whose plurality degree is indicated by the multiple ovals used to represent the painting factors data 329.

For an example, the painting factor data structure 328 may have the following data:

painting factor type data: $B$11 painting factor value data: 40 where: $B$11 in the preferred embodiment is used to specify that the painting factor type is "bell speed".

The painting response data structure 332 includes painting response type data which indicates what painting response it is, such as average filmbuild. The painting response data structure 332 also includes painting response value data to hold the values for each type of painting response in the painting response type data. The painting response type data has a functional interrelationship with the painting factor type data. The painting response value data for each painting response type data is determined based upon the painting response factor data and upon the interrelationship. The painting response type data and the painting response value data is collectively termed painting responses data 333 and whose plurality degree is indicated by the multiple ovals used to represent the painting responses data 333.

For an example, the painting response data structure 332 may have the following data:

```
painting response type data = $C$20
  where: $C$20 is used in the preferred embodiment to refer to
  Average Filmbuild.
painting response value data =
  −2.70744 + 0.188153*(B11)−0.00305333*(B11)^2 + 0.0004
  11889*(B11*C11) + 0.0000323845*(C11*D11)
```

Moreover, the data structure 324 includes a painting factor constraint data structure 336 and a painting response constraint data structure 340. The painting factor constraint data structure 336 indicates which of the painting factor type data is to constrained while the simplex mathematical technique is performed upon the painting factor data structure 328 and upon the painting response data structure 332. The painting factor constraint data structure 336 indicates what are the permissible value ranges for those painting factor type data which are to be constrained during the simplex operations.

For example, the painting factor constraint data structure 336 may have the following data to indicate that the painting factor bell speed (i.e., $B$11) is subject to the following constraints during the simplex operations:

$B$11<=40
$B$11=Integer
$B$11>=30

The painting response constraint data structure 340 indicates which of the painting response type data is to constrained while the simplex mathematical technique is performed upon the painting factor data structure 328 and upon the painting response data structure 332. The painting response constraint data structure 340 indicates what are the permissible value ranges for those painting response type data which are to be constrained during the simplex operations.

For example, the painting response constraint data structure 340 may have the following data to indicate that the painting response average filmbuild (i.e., $C$20) is subject to the following constraints during the simplex operations:

$C$20<=1
$C$20>=0.8

The embodiments which have been set forth above were for the purpose of illustration and were not intended to limit the invention. It will appreciated by those skilled in the art that various changes and modifications may be made to the embodiments discussed in the specification without departing from the spirit and scope of the invention as defined by the appended claims.

What is claimed is:

1. A painting equipment controller for controlling painting equipment so that a predetermined desired level of a painting response is produced, said controller comprising:
   a database for storing a painting factor-response model, said model interrelating at least one predetermined painting factor with the painting response via a painting factor-response function, said painting factors having a level which is indicative of setting values for controlling the painting equipment;
   a database engine connected to said database for determining a first level for said painting response based upon said factor-response function of said model and upon a first level of said painting factors; and
   a cooptimizer connected to said database engine for determining a second level for said painting response based upon said factor-response function of said model and upon a second level of said painting factors which produces the desired level of said painting response;
   whereby said painting equipment is controlled based upon said second level of said painting factors which produces the desired level of said painting response.

2. The controller of claim 1 wherein said model is based upon a design of experiments involving said painting factors and said painting response.

3. The controller of claim 1 wherein said model of said database includes interrelating a plurality of painting factors with a plurality of painting responses.

4. The controller of claim 3 wherein said cooptimizer constrains the permissible level ranges for said plurality of painting factors and for said plurality of painting responses in determining a second level of said painting factors.

5. The controller of claim 3 wherein said cooptimizer includes a computer-human interface for constraining the permissible level ranges for said painting factors and for said painting response in determining a second level of said painting factors.

6. The controller of claim 3 further comprising a simplex calculator module for determining said second level of said painting factors.

7. The controller of claim 3 wherein said database engine determines a level for said plurality of painting responses based upon said model and upon a first level for said plurality of said painting factors.

8. The controller of claim 7 further comprising a data packager for packaging said determined level for said plurality of painting responses, said packaged determined level for said plurality of painting responses being accessible by a computer-human interface.

9. The controller of claim 7 wherein said cooptimizer determines a second level for said plurality of painting factors based upon the determined level of said plurality of painting responses from said database engine.

10. The controller of claim 1 wherein said cooptimizer constrains the permissible level ranges for said painting factors in determining the second level of said painting factors.

11. The controller of claim 1 wherein said cooptimizer constrains the permissible level ranges for said painting response in determining a second level of said painting factors.

12. The controller of claim 1 wherein said cooptimizer constrains the permissible level ranges for said painting factors and for said painting response in determining a second level of said painting factors.

13. The controller of claim 1 wherein said cooptimizer includes a computer-human interface for constraining the permissible level ranges for said painting factors and for said painting response in determining a second level of said painting factors.

14. The controller of claim 1 further comprising a simplex calculator module for determining said second level of said painting factors.

15. The controller of claim 1 further comprising a data communication link for controlling said painting equipment based upon said determined second level of said painting factors, said determined second level of said painting factors being accessible to said painting equipment via said data communication link.

16. The controller of claim 1 further comprising a data packager for packaging said determined level for said painting response, said packaged determined level for said painting response being accessible by a computer-human interface.

17. A computer-implemented method for controlling painting equipment so that a predetermined desired level of a painting response is produced, comprising the steps of:

storing a painting factor-response model in a computer storage medium, said model interrelating at least one predetermined painting factor with the painting response via a painting factor-response function, said painting factors having a level which is indicative of setting values for controlling the painting equipment;

determining a level for said painting response based upon said factor-response function of said model and upon a first level of said painting factors;

determining a second level of said painting factors which produces the desired level of said painting response based upon said factor-response function of said model; and controlling said painting equipment based upon said determined second level of said painting factors which produces the desired level of said painting response.

18. The method of claim 17 wherein said model is based upon a design of experiments involving said painting factors and said painting response.

19. The method of claim 17 wherein said model of said database includes interrelating a plurality of painting factors with a plurality of painting responses.

20. The method of claim 19 further comprising the step of:

constraining the permissible level ranges for said plurality of painting factors and for said plurality of painting responses in determining a second level of said painting factors.

21. The method of claim 19 wherein a computer-human interface is used for constraining the permissible level ranges for said painting factors and for said painting response in determining a second level of said painting factors.

22. The method of claim 19 further comprising the step of:

determining said second level of said painting factors via a simplex mathematical technique.

23. The method of claim 19 further comprising the step of:

determining a level for said plurality of painting responses based upon said model and upon a first level for said plurality of said painting factors.

24. The method of claim 23 further comprising the step of:

packaging said determined level for said plurality of painting responses, said packaged determined level for said plurality of painting responses being accessible by a computer-human interface.

25. The method of claim 23 further comprising the step of:

determining a second level for said plurality of painting factors based upon the determined level of said plurality of painting responses from said database engine.

26. The method of claim 17 further comprising the step of:

constraining the permissible level ranges for said painting factors in determining the second level of said painting factors.

27. The method of claim 17 further comprising the step of:

constraining the permissible level ranges for said painting response in determining a second level of said painting factors.

28. The method of claim 17 further comprising the step of:

constraining the permissible level ranges for said painting factors and for said painting response in determining a second level of said painting factors.

29. The method of claim 17 wherein a computer-human interface is used to constrain the permissible level ranges for said painting factors and for said painting response in determining a second level of said painting factors.

30. The method of claim 17 further comprising the step of:

determining said second level of said painting factors via a simplex mathematical technique.

31. The method of claim 17 wherein said determined second level of said painting factors is accessible to said painting equipment via a data communication link.

32. The method of claim 17 further comprising the step of:

packaging said determined level for said painting response, said packaged determined level for said painting response being accessible by a computer-human interface.

33. A computer-implemented method for controlling painting equipment so that a predetermined desired level of a painting response is produced, comprising the steps of:

(a) storing a painting factor-response model in a computer storage medium, said model interrelating at least one predetermined painting factor with the painting response via a painting factor-response function, said painting factors having a level which is indicative of setting values for controlling the painting equipment;

(b) establishing at least one constraint for said model based upon the desired level of said painting response;

(c) determining a level of said painting factors which produces the desired level of said painting response based upon said model having said established constraint; and (d) controlling said painting equipment based upon said determined level of said painting factors which produces the desired level of said painting response.

34. The method of claim 33 wherein said model having said established constraints includes having the level of at least one painting factor constrained.

35. The method of claim 33 wherein said model of said database includes interrelating a plurality of painting factors with a plurality of painting responses.

36. The method of claim 35 wherein said model having said established constraints includes having the level of a plurality of painting factors constrained.

37. The method of claim 36 wherein said model having said established constraints includes having the level of a plurality of painting responses constrained.

38. The method of claim 33 wherein steps (b) and (c) are iteratively performed until said desired level of the painting response is produced.

39. A memory for storing data for access by a painting equipment controller which is executed on a data processing system, comprising;

a painting factor data structure stored in said memory and having access to information stored in a database, said painting factor data structure including painting factor type data and painting factor value data; and a painting response data structure stored in said memory and having access to the information stored in said database, said painting response data structure including painting response type data and painting response value data, said painting response type data having a functional interrelationship with said painting factor type data, said painting response value data being determined based upon said painting response factor data and upon said interrelationship.

40. The memory of claim 39 further comprising:

a painting factor constraint data structure for indicating which of said painting factor type data is to be constrained when performing a simplex mathematical technique upon said painting factor data structure and upon said painting response data structure, said painting factor constraint data structure indicating a permissible value range for those painting factor value data whose painting factor type data has been indicated as constrained by said painting factor constraint data structure.

41. The memory of claim 40 further comprising:

a painting response constraint data structure for indicating which of said painting response type data is to be constrained when performing a simplex mathematical technique upon said painting factor data structure and upon said painting response data structure, said painting response constraint data structure indicating a permissible value range for those painting response value data whose painting response type data has been indicated as constrained by said painting response constraint data structure.

42. A painting equipment controller for controlling painting equipment so that a predetermined desired level of a painting response is produced, said controller comprising:

a database for storing a painting factor-response model, said model interrelating at least one predetermined painting factor with the painting response via a factor-response function, said painting factors having a level which is indicative of setting values for controlling the painting equipment;

a database engine connected to said database for determining a first level for said painting response based upon said factor-response function of said model and upon a first level of said painting factors;

said database engine being utilized to determine a second level for said painting response based upon said factor-response function of said model and upon a second level of said painting factors in order to produce the desired level of said painting response; and whereby said painting equipment is controlled based upon said second level of said painting factors which produces the desired level of said painting response.

43. The controller of claim 42 wherein said model is based upon a design of experiments involving said painting factors and said painting response.

44. The controller of claim 42 wherein said model of said database includes interrelating a plurality of painting factors with a plurality of painting responses.

45. The controller of claim 44 wherein said cooptimizer constrains the permissible level ranges for said plurality of painting factors and for said plurality of painting responses in determining a second level of said painting factors.

46. The controller of claim 44 further comprising a simplex calculator module for determining said second level of said painting factors.

* * * * *